US005883640A

United States Patent [19]

Hsieh et al.

[11] Patent Number: 5,883,640

[45] Date of Patent: Mar. 16, 1999

[54] COMPUTING APPARATUS AND OPERATING METHOD USING STRING CACHING TO IMPROVE GRAPHICS PERFORMANCE

[76] Inventors: Paul Hsieh, 310 Elan Village La., Apt. 225, San Jose, Calif. 95134; Roey Ben-Yoseph, 247 4th St. #101, Oakland, Calif. 94607; David D. Miller, 725 Cotton St., Menlo Park, Calif. 94025

[21] Appl. No.: 698,365

[22] Filed: Aug. 15, 1996

[51] Int. Cl.[6] .................. G06F 15/16

[52] U.S. Cl. .................. 345/503; 345/141; 345/339; 345/522; 345/192; 711/118; 711/133

[58] Field of Search .................. 345/418, 467–472, 345/141, 142, 144, 339, 352, 501–503, 522, 507, 192–195; 707/530, 531, 534; 711/118–146

[56] References Cited

U.S. PATENT DOCUMENTS

| | | | |
|---|---|---|---|
| 5,590,260 | 12/1996 | Morse et al. | 345/467 |
| 5,592,594 | 1/1997 | Cahoon | 395/115 |
| 5,625,773 | 4/1997 | Bespalko et al. | 345/467 |
| 5,706,462 | 1/1998 | Matousek | 711/118 |
| 5,771,034 | 6/1998 | Gibson | 345/141 |

*Primary Examiner*—Matthew M. Kim
*Assistant Examiner*—U. Chauhan
*Attorney, Agent, or Firm*—Skjerven, Morrill, MacPherson, Franklin & Friel LLP; Ken J. Koestner

[57] ABSTRACT

Various character strings are repeatedly displayed on a graphics display. For example, strings such as “file”, “edit”, “view” and “help” are commonly displayed on nearly every screen. This redundancy of displayed character strings is exploited using a string cache and string caching method. A string cache stores a database of strings along with the rendered forms of the strings. The string cache stores the strings in a rendered form which for particular character strings and attributes and characteristics of the strings. The string cache is stored and accessed local to a graphics accelerator so that a single string request across a system bus activates the display of the entire string, including a display of the selected attributes and characteristics.

23 Claims, 5 Drawing Sheets

COMPUTING APPARATUS AND OPERATING METHOD USING STRING CACHING TO IMPROVE GRAPHICS PERFORMANCE

BACKGROUND OF THE INVENTION

1. Field of the Invention

The present invention relates to a computer system including a graphical users interface (GUI). More specifically, the present invention relates to an apparatus and method for caching character strings to improve the performance of the GUI during the display of text strings.

2. Description of the Related Art

Computer systems generally include a graphical users interface (GUI) for displaying information on a display screen. The GUI supplies the drawing functions for lines and shapes, color management and font handling. One task of a GUI is the display of textual material on the screen. A glyph generation, the rendering and display of text characters on a display, is a time-intensive operation that often sets the pace of operation of many GUI operations. (A glyph is defined as an image, usually of a character, in a font, or a graphic symbol having an appearance that conveys information.) A rendering, as defined in the field of computer graphics, refers to the creation of an image on a display screen from data that describes the screen. Examples of rendering operations include the creation of a three-dimensional image that incorporates the simulation of lighting effects such as shadowing and reflections and in multimedia videotaping, the creation of a realistic image from objects and light data in a scene. Rendering of text includes the operations of forming text characters according to a specific defined font, coloration of the text character and background, positioning of the character on a display screen, and similar operations defining a character display.

Multimedia computer systems often include hardware accelerators to improve performance of media displays and other output devices. One common hardware accelerator is a graphics accelerator. A graphics accelerator is a hardware device dedicated to increasing the speed and performance of graphics. Graphics accelerators implement I/O-bound or computation-intensive tasks such as blits, polygons and text rasterization, freeing a central processing unit in a multimedia computer system for other operations Graphics accelerators are used to improve the performance of text displays by rapidly displaying text bitmaps on a monitor.

One technique which has been employed to improve the performance of text display in a GUI is the usage of a font cache. A font cache is a cache memory for storing individual characters in a defined font size and style. The rendering of a character is stored in the font cache as needed. When a character is requested for display, a hashing operation is performed on the character font to generate an index for accessing the character for display. A string of characters is displayed by individually dereferencing the input characters in the defined font and building a string display from pieces of the characters. A string is defined as a connected sequence of characters or bits treated as a single data item.

Usage of a font cache improves the performance of text displays and efficiently uses the cache memory. However, the display software includes an operating loop for individually displaying each character in the string in a pipeline manner. The individual display of each character hinders the performance of a text display. In GUI system using a graphics accelerator, a request to display each character is transferred to the graphics accelerator, generally via the system bus, and the font cache is accessed for each transferred character. Furthermore, spacing and orientation are calculated on a per-character basis. For each access of the font cache, an individual character bitmap is generated for display. The transfer of a request to display a character over the system bus is typically the operation which limits the performance of a computer system using a graphics accelerator. Text is generally displayed as a character string so that data is transferred over the system bus to the font cache in the graphics accelerator for each character of the character string.

Font caching typically includes the steps of finding a font corresponding to a requested display character and determining whether the character font is stored in the font cache. If the font character is not available in the font cache, the font character is placed in the font cache. Then, on a character-by-character basis, the font cache technique involves ascertaining whether the character is contained in the font cache. If the character is not cached, a bitmap character corresponding to the character and selected font is stored in the font cache. The position of the character in the font cache is determined and sent to the accelerator via the system bus. The accelerator receives the position of the character from the system bus, accesses the font cache using the received position of the character and displays the individual character using the accessed data from the font cache. The process is repeated for each character.

The font caching technique improves the performance of a computer system during display of characters because rendering of the individual characters is avoided after the cache is initialized. When a font modification is made the cache generally is reinitialized, thereby ensuring stability. Furthermore, many calculations are necessary to form a sequence of characters in a string. The position of each displayed character is calculated on a character-by-character basis. A sequence of characters is typically displayed by scanning from left-to-right across a line and, at the end of a line, down to a next line. Accordingly, no a priori information is known regarding the position of a character with respect to a previous character in a sequence. RAM is generally optimized for sequential transfer rather than an indeterminate "zig-zag" access that tends to result from operation using the font caching technique.

What is needed is a computer system and operating method for improving the performance of a graphical users interface (GUI) with respect to the display of textual characters.

SUMMARY OF THE INVENTION

Various character strings are repeatedly displayed on a graphics display. For example, strings such as "file", "edit", "view" and "help" are commonly displayed on nearly every screen. In accordance with the present invention, this redundancy of displayed character strings is exploited using a string cache and string caching method.

In accordance with the present invention, a string cache stores a database of strings along with the rendered forms of the strings. The string cache stores the strings in a rendered form which for particular character strings and attributes and characteristics of the strings. The string cache is stored and accessed local to a graphics accelerator so that a single string request across a system bus activates the display of the entire string, including a display of the selected attributes and characteristics.

Thus, in accordance with the present invention, a string cache is used so that a simple and computationally nonintensive hash function determination is traded for a glyphcomposing operation. The glyph-composition operation, described hereinbefore with respect to the related art, involves a substantial amount of computation which hinders the operation of a graphic accelerator.

In one embodiment, an index to the string cache is formed using a hash function that is generated by adding, rotating and XORing the character strings and attributes of the strings.

The described string cache apparatus and method achieves many advantages. One advantage is that a character string is displayed with a substantial reduction in communication with a graphics accelerator across a system bus.

An additional advantage is that a string is typically displayed using a sequential scan across the display memory to the end of a display line. A reset of the position coordinates takes place once at the beginning of each scan line. In contrast, a string is displayed in a conventional graphics system by resetting the position coordinates for each character. A linear scan across a raster display line is hastened by a graphics accelerator in the described method and system while the calculation of each position in the display for a system utilizing conventional font caching is executed by the substantially slower host computer.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

DETAILED DESCRIPTION OF THE PREFERRED EMBODIMENTS

Figure 1:
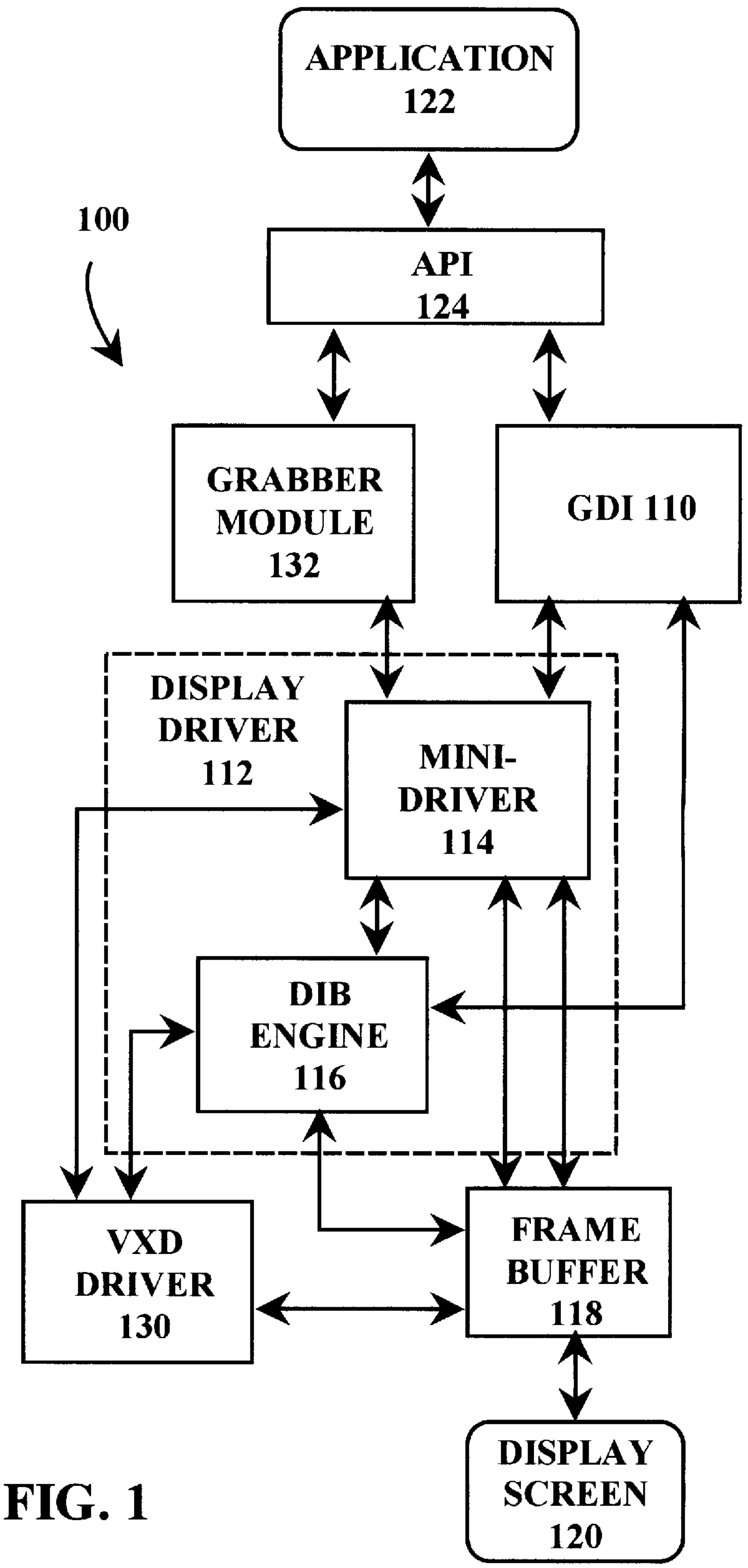
FIG. 1 is a schematic block diagram illustrates an exemplary embodiment of a graphical interface.

Referring to FIG. 1, a schematic block diagram illustrates an exemplary embodiment of a graphical interface 100. The graphical interface 100 includes a graphics device interface 110 and a display driver 112. The graphics device interface 110 and display driver 112 are software layers, or overlays for storing text and images, that drive the graphical interface 100. The graphics device interface 110 processes general two-dimensional graphics commands and decomposes the graphics commands into device-specific commands that are processed by the display driver 112. The display driver 112 includes two components, a device-specific mini-driver 114 and a Device-Independent Bitmap (DIB) Engine 116. The DIB Engine 116 is a library of functions that is supplied with a format of a graphics frame buffer 118 which stores graphic images for display on a display screen 120. The DIB Engine 116 supports all graphics device interface 110 function calls. Two components, the graphics device interface 110 and the DIB Engine 116 are standard WindoWS™ components and have a consistent, invariable and well-defined behavior. The DIB Engine 116 and the mini-driver 114 in combination perform as a single display driver with the display screen 120 directly addressable as a memory region.

Due to the device-independent operation of the graphics device interface 110, the graphics device interface 110 interfaces to a device only through a device driver. In fact, the graphics device interface 110 interfaces to graphics display hardware through two device drivers, the DIB Engine 116 and mini-driver 114 in combination one hand, and an additional driver, called a "virtually anything driver" (VxD) 130.

The DIB Engine 116 and the display mini-driver 114 are both dynamically loadable libraries (DLLs). The DIB Engine 116 is loaded at initialization by display drivers that rely on the DIB Engine 116. The combined DIB Engine 116 and minidriver 114 operate as a ring three dynamically loadable library (DLL) that runs in the context of the system virtual machine. The path from a Windows™ application 122 is direct, a call to a Windows™ system dynamically loadable library (DLL) which calls the display driver. No ring transition occurs and the display driver has direct access to the graphics frame buffer 118.

The VxD 130 is used to virtualize the video hardware and control switching of the display screen 120 between different virtual machines. Windows™ uses the VxD 130 to initiate a hardware control operation, for example to switch between full screen VGA mode and a Windows™ desktop mode.

The graphical interface 100 also includes a grabber module 132 for supporting MS-DOS applications. The grabber module 132 saves and restores the state of video hardware and the video memory. The grabber module 132, VxD 130 and display mini-driver 114 are developed in cooperation to match the display hardware type. The VxD services used by the grabber module 132 include functions for copying data between the video memory and graphics frame buffer 118, functions for synchronizing primitives that assist critical section management, and switching between virtual machines.

The graphics device interface 110 includes all of the drawing functions for lines and shapes, color management functions, and font handling functions. At the application level, Windows™ supplies logical objects called device contexts that describe the state of a specific GDI drawing target including any output device or any representation of an output device. Applications programs 122 manage the device contexts using Win32 Application Programming Interface (API) 124 or a predecessor 16-bit Windows API alone, although the data structure of the device contexts is hidden from the application 122. A device context holds information about objects such as a current pen for drawing lines, a current brush for filling regions, color selection, and the location and dimensions of a logical drawing target.

Various windows applications 122 operate on a widely disparate range of devices in a device-independent manner through usage of the Windows API 124. An application 122 never writes directly to an output device. Instead, an application 122 calls GDI functions identifying particular device contexts and other logical objects. The graphics device interface 110 transforms data into a format which is suitable for usage by each specific device driver. The device driver places a representation of the request on the output device.

A completed sequence of GDI operations forms a memory-based bitmap object representation that is suitable for immediate display on a compatible output device. For a device-dependent bitmap, a small amount of additional processing prepares the object for display to a different device. Bitmaps are stored in files and memory, and applied on resources such as graphic display screens. Applications and device drivers build bitmaps in memory and directly manipulate the bitmaps while in the memory. The DIB Engine 116 performs a bitmap management function that supports a large linear memory space with each pixel directly addressable as a memory location. The bitmap memory, specifically the graphics frame buffer 118, that is manipulated by the DIB Engine 116 is shared with the graphics device interface 110. The pixels are encoded for color display with the DIB Engine 116 encoding color in resolutions of 1, 4, 8, 15, 16, 24 or 32 bits per pixel color so that colors range from monochrome to 16.7 million colors. A primary function of the DIB Engine 116 is the performance of rendering algorithms for display drivers that are implemented without supporting all rendering primitives.

The DIB Engine 116 sets a particular pixel color by storing the appropriate number of bits in a selected memory location in the graphics frame buffer 118.

The DIB Engine 116 is associated with a display mini-driver 114 which is called by the graphics device interface 110. The display mini-driver 114 manages hardware-dependent operations in concert with the display driver and VxD 130. The graphics device interface 110 always calls the DIB Engine 116 through the display mini-driver 114, never directly. The DIB Engine 116 performs hardware-dependent operations by direct access to the graphics frame buffer 118 as supplied by the display driver.

The DIB Engine 116 uses generic software algorithms for rendering to the display memory, the frame buffer 118. However, the frame buffer 118 is configured by the display driver. The display mini-driver 114 uses two data structures to interact with the DIB Engine 116 and the graphics device interface 110. First, a GDIINFO data structure is used for device-related operations of the graphics device interface 110. The GDIINFO stores information which is common to all devices. The GDIINFO structure defines the operations of a device with respect to drawing of lines, circles, text and the like. Also calls between the graphics device interface 110 and the device drivers commonly pass a pointer to a suitable GDIINFO structure as a calling parameter.

The display mini-driver 114 supports additional functionality of the display adapter, such as hardware acceleration operations. Second, a DIBENGINE structure specifies the size of a device descriptor structure, typically called a PDEVICE structure, which is associated with a device. The PDEVICE structure is entirely device-dependent having a size and contents that vary according to the type of device. For a display mini-driver 114, the PDEVICE structure is a DIBENGINE structure. The GDIINFO structure and the DIBENGINE structure, in combination, contain all information relating to a device that uses the DIB Engine 116.

Windows™ loads a display mini-driver 114 and calls a DLL initialization routine for the display mini-driver 114, causing the display mini-driver 114 to acquire configuration information from the system registry or SYSTEM.INI file. Subsequently during initialization, the graphics device interface 110 calls the Enable interface of the display mini-driver 114 twice. The first Enable interface call is made using a DIB_Enable call. The DIB Engine 116 passes a pointer to a suitable GDIINFO structure. The display mini-driver 114 fills device-dependent fields such as a field designating the number of bits per pixel and returns the GDIINFO structure pointer to the graphics device interface 110. The second Enable interface call performs the remainder of the initialization operations including calling the display VxD 130 so set the hardware into a suitable graphics mode.

When the installation is complete, the graphics device interface 110, the mini-driver 114, the DIB Engine 116, and the display VxD 130 are operative for displaying graphics on the display screen 120. The display mini-driver 114 supplies a standard set of interfaces for performing GDI/driver interactions. These standard interfaces are exported entry points from the driver DLL. Some functions accept a call from the graphics device interface 110 and transfer the call directly to the DIB Engine 116. The screen cursor is primarily managed by the display mini-driver 114.

Figure 2:
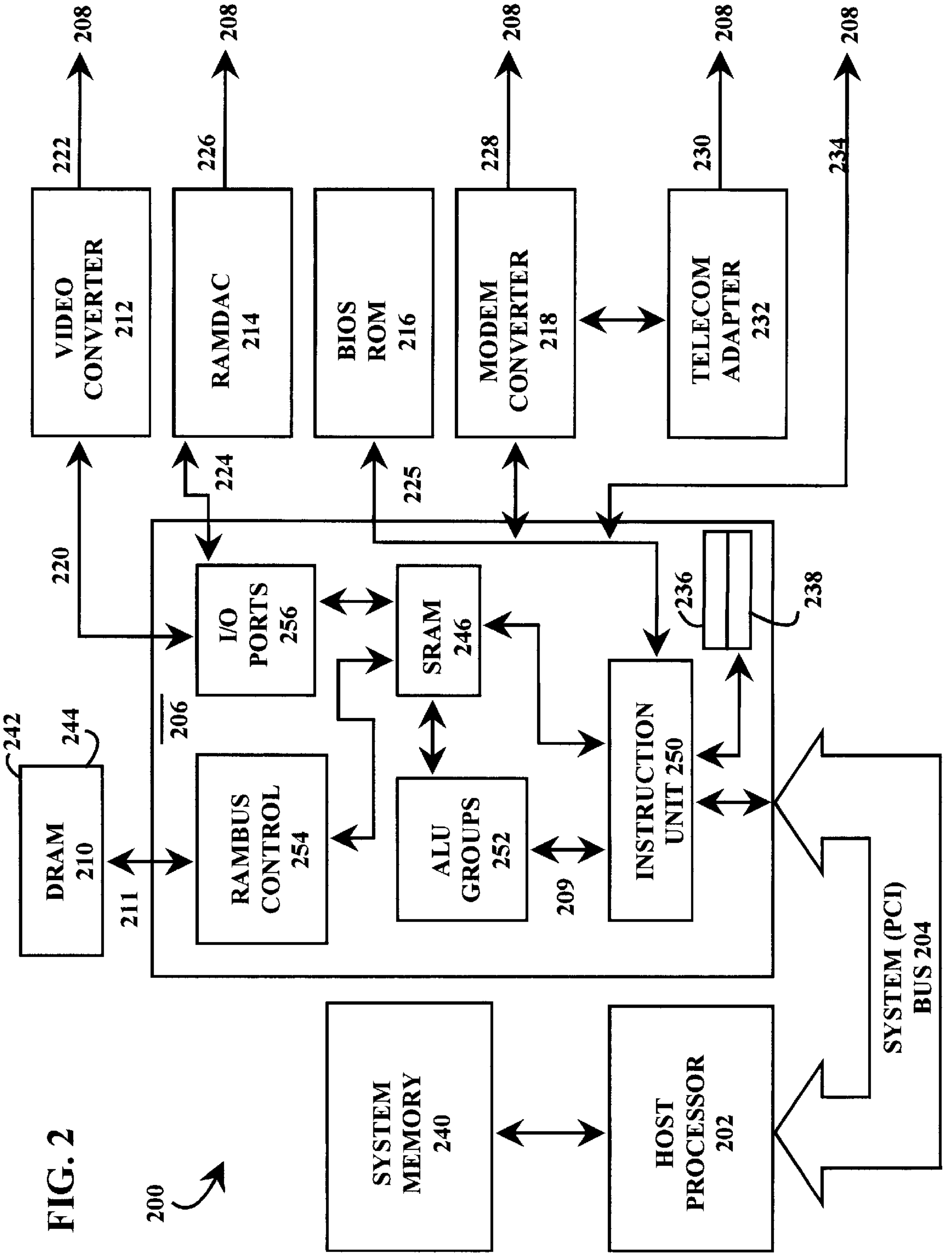
FIG. 2 is a schematic block diagram showing a computer system including high performance multimedia functionality.

Referring to FIG. 2, a schematic block diagram shows a computer system 200 that includes high performance multimedia functionality. The computer system 200 includes a host processor 202, a system bus 204, a multimedia processor 206 which is connected to the host processor 202 by the system bus 204, and a plurality of performance devices 208 which are driven by the host processor 202.

In one embodiment, the host processor 202 is a Pentium™ or Pentium Pro™ (P6) x86 microprocessor running a Windows 95™ operating system. The computer system 200 executes software including a resource manager based in the host processor 202, a real-timer kernel based in the multimedia processor 206 and various device drivers for individual devices.

In the illustrative embodiment, the multimedia processor 206 is a proprietary special-purpose processor designed by Chromatic Research, Inc., Sunnyvale, Calif. called an Mpact media engine. The multimedia processor 206 interfaces to a host processor 202 in a multimedia computer system 200 to supply functionality including digital video encoding, decoding and playback acceleration, superVGA 2D graphics acceleration, 3D graphics acceleration, CD-quality stereo audio and realistic sound effects, FAX/modem capabilities, a range of telephony options and desktop videoconferencing. The multimedia processor 206 includes a static RAM (SRAM) 246 for storing both instructions and data, an instruction unit 250, five function units called ALU groups 252, a Rambus controller 254, and I/O port controllers 256. The multimedia processor 206 is connected to a high-speed (500 MB-per-second) Rambus DRAM memory and includes a 792-bit internal data path 209 for handling large volumes of multimedia data, such as video image data, to achieve an enormous data throughput of an estimated 2 billion integer operations per second. The 792-bit internal data path is fed by eleven 72-bit wide output terminals from various processing unit groups and the SRAM read ports arranged in parallel. In contrast, the Pentium Pro™ (P6) x86 has a substantially smaller 64-bit data path and an operation rate of 200 million integer operations per second. The multimedia processor 206 uses a Very Long Instruction Word (VLIW) technology, vector processing, and single-instruction multiple data (SIMD) technology to achieve extensive parallel operation.

The multimedia processor 206 operates under control of a real-time multitasking kernel and simultaneously addresses the five semi-independent, quasi-specialized execution units 252. The multimedia processor 206 transmits and receives data simultaneously over five high-speed I/O buses at up to 500 megabytes per second (MB/s) so that the multimedia processor 206 never waits to send or receive data between peripherals, the system bus 204, or the Rambus DRAM memory 210. Also simultaneous with the operation of the five high-speed I/O buses, the 792-bit-wide internal data path moves up to 8 billion integers per second between hundreds of arithmetic logic units working in parallel to achieve 2 billion integer operations per second for most functions, and up to 20 billion integer operations per second for a time-critical motion estimation function used in video encoding and videoconferencing.

The multimedia processor 206 fetches instruction words on every clock cycle. Each instruction word contains two instructions or opcodes. Each opcode operates on 2 to 16 integers simultaneously, enabling as many as 32 integer operations to occur in parallel for each clock cycle. Vector instructions can automatically perform multicycle operations on an array of operands, achieving improved efficiency in comparison to execution of the operations in traditional program loops.

The multimedia processor 206 is a single, multiple-function, multimedia processor that performs multiple functions that have conventionally been performed using separate fixed-function accelerators for graphics and audio functions. The multimedia processor 206 combines MPEG-1 encode and decode functionality, MPEG-2 decoding, and high-speed modem emulation with audio, video, graphics acceleration, and telephony features including speaker phone and video conferencing.

The multimedia processor 206 includes a programmable core (not shown) for performing multimedia data processing for executing the various audio, video, communications and graphics functions.

The multimedia processor 206 is connected to the host processor 202 by a system bus 204, in particular a personal computer interface (PCI) bus operating at a maximum bandwidth of 50 Mbyte/s. The multimedia processor 206 is connected to a Rambus DRAM memory 210, a video converter 212, a RAMDAC 214, a BIOS read-only memory (ROM) 216, and an audio stereo modem converter 218. The multimedia processor 206 is connected to the Rambus DRAM memory 210 by a 500 Mbyte/s Rambus interface 211. The video converter 212 is connected to the multimedia processor 206 by a video bus 220 carrying data at a 27 Mbyte/s rate and connected to a video display (not shown) by an analog video I/O line 222. The RAMDAC 214 is connected to the multimedia processor 206 by a display bus 224 carrying data at a 200 Mbyte/s rate and connected to an RGB monitor (not shown) by an RGB cable 226. The audio stereo modem converter 218 is connected to the BIOS ROM 216 as well as the multimedia processor 206 via a 2 Mbyte/s peripheral bus 225. The audio stereo modem converter 218 has external interfaces to an audio speaker (not shown) via a stereo audio I/O line 228 and to two RJ-11 telephone lines 230 via a telecom adapter 232. The multimedia processor 206 also includes ajoystick interface 234.

The peripheral bus 225 has 14 virtual access channels for communicating with peripherals. Microprogrammable channels 0 to B are controlled by external devices and are used for DMA at a total bandwidth of up to 5 MB/s. For DMA operations, an external signal triggers a micro-program that transfers data to or from an external device. The microprogrammable channels 0 to B are unidirectional and half-duplex and some are configured using either a parallel or serial interface. The parallel channels are highly programmable and support a wide variety of current CODECs or other peripherals. Channels C and D are controlled by register accesses from the system (PCI) bus 204 or the multimedia processor 206. Common transactions are resident in a microprogram control store memory (not shown) of the multimedia processor 206 to increase I/O throughput and to reduce service latency. Unusual transactions, such as error handling operations, are stored in Rambus DRAM memory 210 and loaded on demand into control store memory. Serial channels support a programmable protocol that directs a channel to transfer data based on clock and synchronization signals supplied by an external device, such as an audio CODEC. Channel C is dedicated to ROM and has a micro-program which is hard-wired to output a 24-bit address to the ROM, pause for the ROM access time, then read the data into a register. Channel D is a general-purpose, internally requested channel for writing control registers and reading status in external devices.

The Rambus DRAM memory 210 is a single high-speed multimedia memory buffer having typical capacity of 2 Mbyte or 4 Mbyte and serving as a central storage for all multimedia data and mediaware modules. The Rambus DRAM memory 210 communicates with the multimedia processor 206 using direct memory access (DMA), with the Rambus interface 211 moving data to and from the Rambus DRAM memory 210 on a microsecond-by-microsecond basis where the data is made available to the processor core of the multimedia processor 206. The computer system 200 does not include virtual memory-management hardware since all programs run in real memory out of the Rambus DRAM memory 210.

The video converter 212 sends and receives 16-bit YUV video data and supports pixel scaling, color conversion and dithering. The video bus 220 and the peripheral bus 225 share an interface with the Rambus DRAM memory 210 with the video bus 220 having priority over the peripheral bus 225.

The RAMDAC 214 is used for displaying graphics and operates in response to graphic commands that originate from the host processor 202. Signals corresponding to the graphic commands generally limited to resolution definition and color calibration commands are communicated to the multimedia processor 206 via the system bus 204 to drive a graphic monitor (not shown) via the RGB cable 226. In this manner, Windows-type graphics are displayed on the graphic monitor.

The BIOS ROM 216 supports a VESA video BIOS extension 2.0 at various resolutions including resolutions of 640×480 for 256 colors and 800×600 for 16 colors.

The audio stereo modem converter 218 supports Modem and FAX up to 28,800 baud with support for speakerphone and simultaneous data and voice transmission.

The computer system 200 includes a system memory 240, a video memory 242, a static RAM (SRAM) 246, and the Rambus DRAM memory 210. The Rambus DRAM memory 210 is physically incorporated onto a circuit board (not shown) that also physically holds the multimedia processor 206. The Rambus DRAM memory 210 is directly accessible and addressable by both the host processor 202 and the multimedia processor 206. The single 16 Mbit Rambus DRAM memory 210 serves as a multimedia core memory and generally includes either two or four megabytes of memory and transfers one byte every 2 ns, or one 72-bit word every 16 ns, giving rise to a 62.5-MHz core clock rate of the multimedia processor 206. Two DRAMs are used for MPEG-1 encoding or MPEG-2 decoding. The Rambus DRAM memory 210 is allocated to multiple functions such as a frame buffer memory, wavetable data buffers, modem data buffers, video memory, including off-screen video memory and off-screen bitmaps.

The SRAM 246 is multiported with connections to the system bus 204, the Rambus DRAM memory 210 via a 500 Mbyte/s Rambus interface 211, the 792-bit internal data path 209, the video bus 220 and the peripheral bus 225. The SRAM 246 is controlled completely by software with little hardware support. Software programs configure data and instruction areas of the SRAM 246. The 4K SRAM 246 is organized into 51272-bit words. Software partitions the SRAM 246 into instruction and data areas. The instruction area is configurable to 256, 512, or 1K bytes. The instruction area is a direct-mapped cache with a 128-byte line size. The data area is self-managed, having the form of a scratch-pad memory with no set line size.

A software queue 244 is defined and accessed to perform a software queue operation. The software queue 244 is used for communicating graphics information from the host processor 202 to the multimedia processor 206. More specifically, the software queue 244 communicates commands and requests from the host processor 202 to a graphics display via the multimedia processor 206. The commands and messages typically include an address or index into a memory and data that corresponds to the particular address or index. The address or index defines an operation that is to be executed by-the multimedia processor 206. The data is operated upon by the defmed operation. Examples of two-dimensional graphics operations include solid fill, pattern fill, color expansion, screen-to-screen copy, text, line draw, polygon draw operations and the like. Examples of three-dimensional graphics operations include rectangle fills, 3D spans and 3D geometric primitives such as lines, triangles and quadrilaterals. Other three-dimensional graphics operations include Z-buffering and double buffered rendering, texture heaps, allocating and bitmapped textures, texture memory status, and textured primitives.

The software queue 244 is located in an offscreen portion of video memory 242. Positioning and sizing of the software queue 244 in the video memory 242 are highly advantageous for allowing the queue size to be tailored to needs of a particular graphic display operation. In particular, the software queue 244 may be defined to a very large size to accommodate the large amount of data that is commonly transferred in graphics operation. The software queue 244 is sized to a sufficient capacity to accommodate the information volume associated with occasional peak flows of graphic information. Typical defined sizes of the software queue 244 range from about 4 kbytes to 63 kbytes. The size of the software queue 244 is set in an entirely software-driven operation by modifying appropriate define commands in program include files, rebuilding the drivers in the operating system, and rebuilding the thread. Advantageously, software queues are supplied through software modifications alone, without any hardware enhancement or modification. Because the software queues are entirely defined in software, operating parameters of the software queue are easily tuned to particular data communication conditions and applications.

Figure 3:
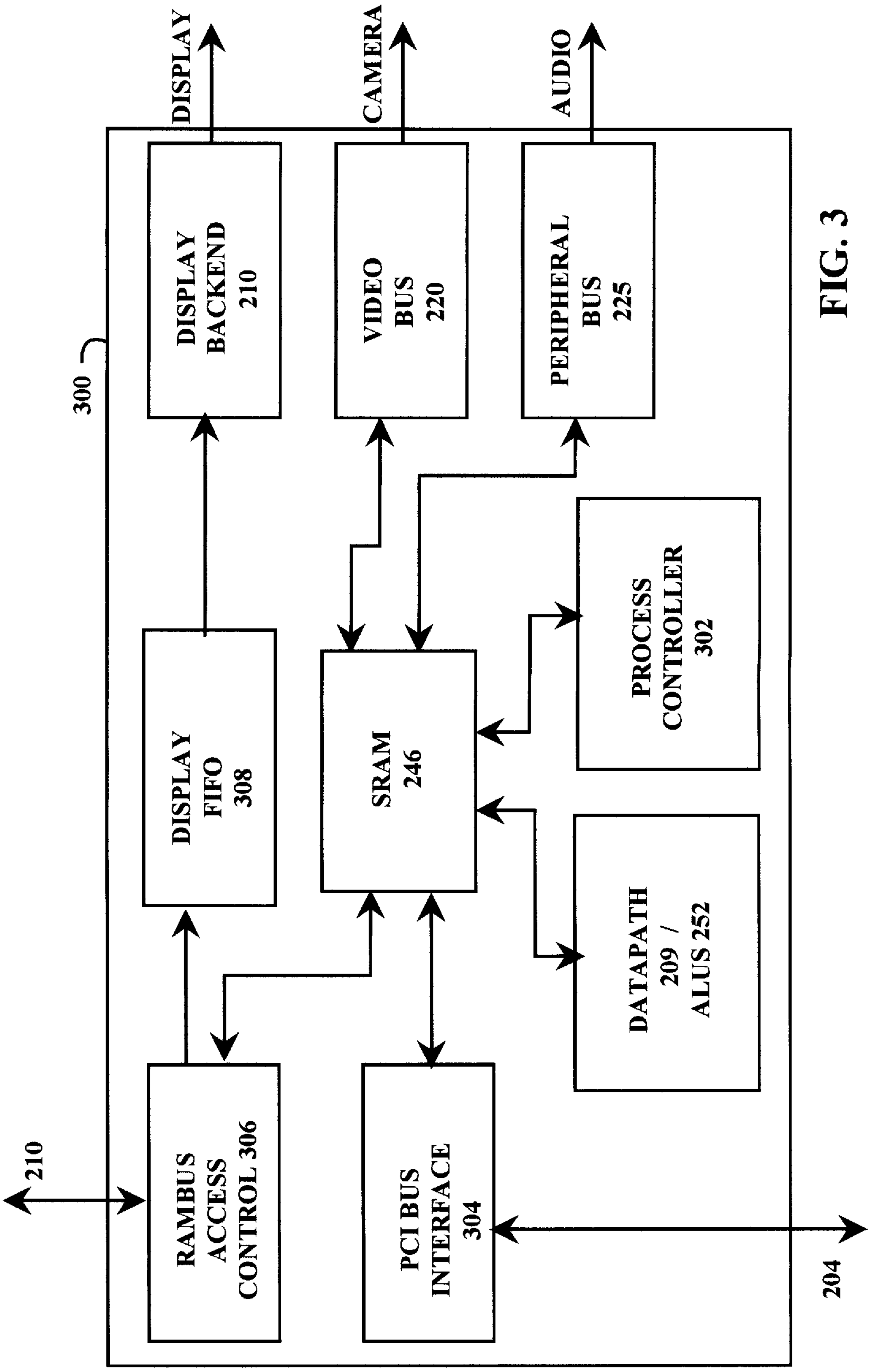
FIG. 3 is a schematic block diagram which depicts a multimedia buffer memory of the computer system shown in FIG. 2.

Referring to FIG. 3, a schematic block diagram illustrates the multimedia buffer memory 300. The multimedia buffer memory 300 has a central storage supplied by the SRAM 246. The SRAM 246 is connected to the 792-bit internal data path 209, and a process controller 302 which controls operations of the multimedia processor 206. The SRAM 246 is also connected to a television camera via the video bus 220 and connected to audio and modem peripherals via the peripheral bus 225. The SRAM 246 is connected to the system (PCI) bus 204 via a PCI bus interface 304. The SRAM 246 is connected to the Rambus DRAM memory 210 through a Rambus DRAM access controller 306. The Rambus DRAM access controller 306 drives display signals to a peripheral display through a display FIFO 308 and a display backend 310.

Figure 4:
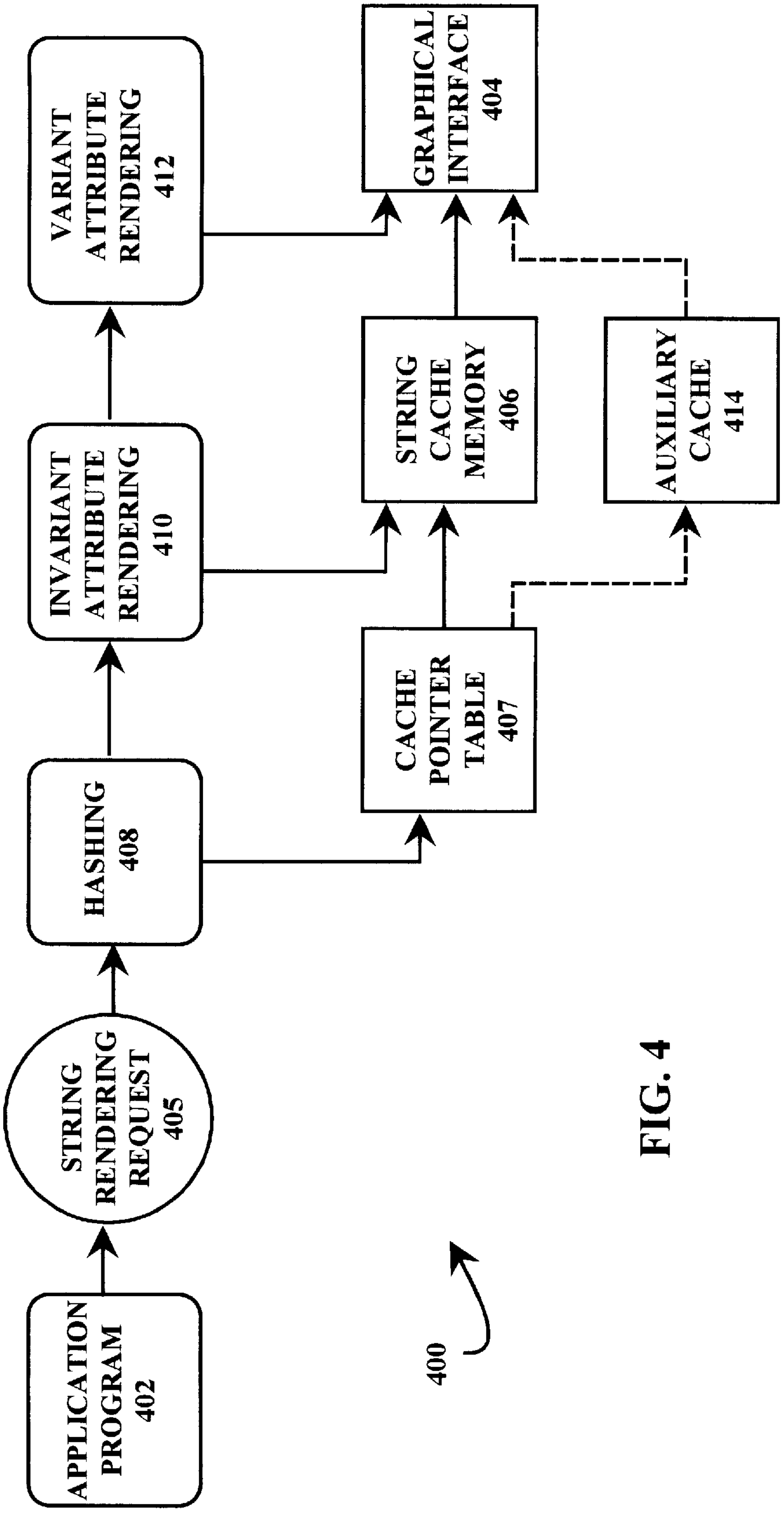
FIG. 4 is a high-level schematic block diagram showing operations of a string caching operation.

Referring to FIG. 4, a high-level schematic block diagram of a string caching operation 400 is shown. An application program 402 generates various requests to a graphical interface 404. One type of request is a string rendering request 405. Some strings are repeatedly rendered and displayed on a display screen so that advantages are gained by rendering a string, including rendering of particular generally-invariant string attributes and characteristics of the string, and saving the rendered version of the invariant string attributes and characteristics in a string cache memory 406. Other attributes and characteristics of a string, called variant attributes and characteristics, are more likely to be changed among multiple screen renderings. Rendering of variant string attributes and characteristics is applied to the cached version of invariant string attributes and characteristics in preparation for final display of the string.

Invariant attributes and characteristics of strings include the specific sequence of characters in the string, the length of the string, a font selection, a text transform or rotation selection designating the angle that the text is displayed, a character or chart width, a designation of whether the string is italicized, bold-faced, striked-out, and other special effects.

Variant attributes and characteristics of strings include color selection of the character, the color and transparency mode of the background, the X and Y coordinate position on the display, clipping information designating portions of display elements that lie outside of a boundary, and other parameters that commonly change as screen displays change. For example, the variant attributes and characteristics of strings commonly change as a window is moved, a highlighting effect is applied or text becomes partially obscured.

Clipping is the removing of portions of an image that are outside the boundaries of the edge of a window or display screen or which have been obscured by another window. Certain graphics programs support clipping as a means of masking everything but a certain object so that painting tools, for example, can be applied to the object alone.

The cached version of invariant string attributes are stored as a monochrome bit map and the attributes and characteristics classified as invariant are structural characteristics of shape, form and size that cannot be changed without changing the bit map. For example, the font shape and font size are fundamentally defined by the bit map and, therefore, cannot be changed without changing the bit map. Accordingly, the font shape and font size are invariant attributes and characteristics.

In contrast, variant characteristics are modified without changing the character bit map of the string. For example, the X and Y position of a string on the display is changed by modifying the beginning coordinate position of the same character bit map when the string is sent to the display. The clipping information is changed by accessing the same character bit map but clipping portions of bit map immediately prior to display. Similarly, the foreground and background colors are changed by modifying the draw mode of the display of an unchanged character bit map. The variant parameter effects are applied as part of a "monochrome expand" command which is sent to the multimedia processor 206

Two rendering processes are included in the string caching operation 400, an invariant attribute rendering process 410 and a variant attribute rendering process 412. A string rendering request 405 activates the invariant attribute rendering process 410 if an identical string with the same invariant attributes is not currently in the string cache memory 406. The invariant attribute rendering process 410 performs a hashing operation 408 to generate an identifier, such as a pointer or index, for identifying an input string and applies the identifier to a cache pointer table 407. A separate hashing function is also applied to the font as in the font caching technique described previously herein. The cache pointer table 407 is used to activate the string caching operation 400 to display the string, if the string is present in the string cache memory 406, or otherwise to perform a preliminary rendering of the string and stores the result of the preliminary rendering into the string cache memory 406. In some embodiments, an auxiliary cache 414 is used to select a correct string cache memory 406 entry when the hashing operation 408 generates multiple identical indices for different strings, a very low probability occurrence. The invariant attribute rendering process 410 also performs a hashing scheme to transform a search key into an address for the purpose of storing and retrieving items in the string cache memory 406.

The variant attribute rendering process 412 is activated for a string that corresponds to an entry in the string cache memory 406 and functions by accessing the stored entry and applying rendering of the variant attributes. After the variant attributes are added, including rendering of color, translation, clipping and the like, the string is monochrome-expanded onto a frame buffer surface.

Typically, once the string cache memory 406 is pre-rendered to a sufficient degree, nearly all strings which are encountered are rendered from the string cache memory 406.

Figure 5:
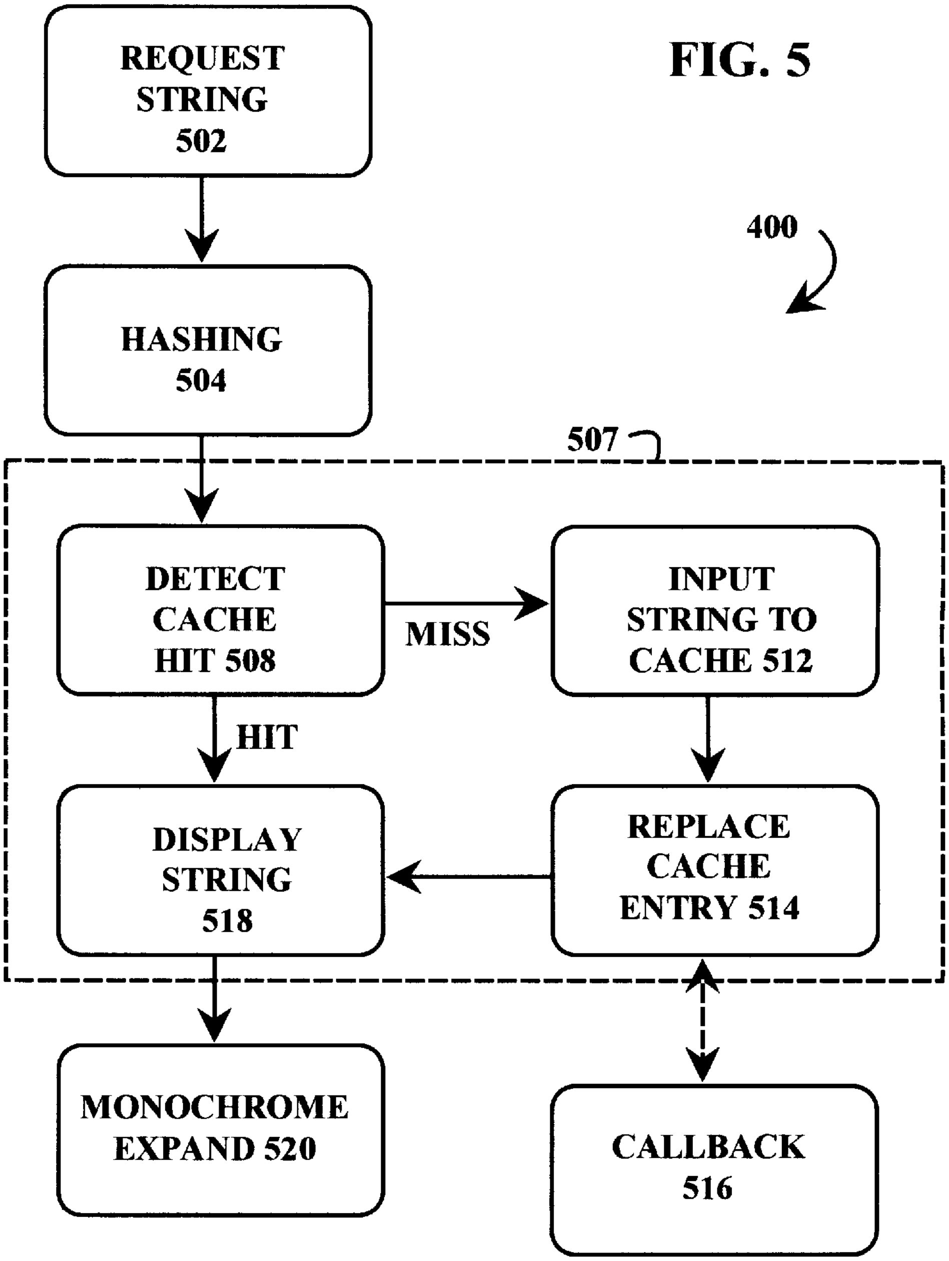
FIG. 5 is a flow chart illustrating operations of the string caching operation.

Referring to FIG. 5 in combination with FIG. 4, a flow chart illustrates the operations of the string caching operation 400. Operations of the string caching operation 400 are executed in the host processor 202. The multimedia processor 206 executes a monochrome expand operation of a cached monochrome bit map into a color screen format for display.

The string caching operation 400 begins with a request string operation 502 from an application routine. The string caching operation 400 includes a hashing operation 504 and an associative caching procedure 507 to map the hash value to the string cache memory 406 in the non-visible portion of the video memory 242. The associative caching procedure 507 includes a detect cache hit step 508, a input string to cache operation 512, and a replace cache entry operation 514. A display string operation 518 uses a monochrome expand operation 520 executed in the multimedia processor 206.

In some embodiments, the string caching operation 400 includes a routine for determining whether an input string is cacheable. The cacheable string verify operation 506 analyzes an input string with respect to a predetermined criteria and, as a result of the analysis, either continues with the string caching operation 400 or displays the input string without caching. One suitable criterion is string length so that a string longer than a preset limit is not cached.

The input string in combination with the invariant parameters forms a data record that is processed using a hashing operation 504 for transforming a search key into an address for the purpose of storing and retrieving items of data. The hashing operation 504 employs a series of rotate, ADD and XOR operations, rather than more time and cycle intensive operations, to reduce search time. The hashing operation 504 also performs a key-to-address transformation in which the keys determine the location of the data. In an indexed data set, the process of transforming a record key into an index value for storing and retrieving a record.

The hashing operation 504 forms the input string and invariant parameters into a 64-bit data record including a 32-bit odd word and a 32-bit even word using a hashing operation in which the bytes of the input data and the invariant parameters are added and rotated into the 64-bit accumulator data record. The 64-bit data record is used as an index into a cache pointer table 407. However, to reduce the size of the cache pointer table 407, the twelve least significant bits of the 64-bit accumulator record is used as a pointer into the cache pointer table 407 so that a 2048 entries in the cache pointer table 407 are addressed. The 12-bit pointer indexes into the cache pointer table 407 which includes a plurality (2048) of pointers to locations in the string cache memory 406. The cache pointer table 407 is a fixed table of pointers into the string cache memory 406.

In one embodiment, the cache pointer table 407 is a data structure including information in addition to the pointers to the string cache memory 406. The cache information includes a definition of the size of the string cache memory 406, a copy of the fill 64-bit index that is truncated to the 12-bit pointer, a cache height, a cache width and alignment information.

The 64-bit index is used to determine whether a cache hit occurs for an input string. Although only twelve bits of the index are used to point to an entry in the string cache memory 406, the full 64 bits of the original bitmap index which are calculated at the time a string is written to the cache are stored. The fill 64 bits are used to verify that an actual cache hit has occurred, preventing the display of an incorrect string with an extremely high probability.

In a detect cache hit step 508, the 12-bit pointer indexes into the cache pointer table 407 and the 64-bit index for the input string is compared to the 64-bit string stored in the cache pointer table 407. A match of the 64-bit indices match indicates a string cache hit. A failure to match the indices indicates a string cache miss. A string rendering request 405 activates the invariant attribute rendering process 410 if an identical string with the same invariant attributes is not currently in the string cache memory 406.

The alignment information in the cache pointer table 407 is used to compensate for the alignment of an original text bit map. The DIB Engine 116 is used to draw the original text bitmap, which is drawn with a selected alignment with respect to X and Y coordinates. The alignment information in the cache pointer table 407 stores the original alignment of the text bit map so that compensation for the alignment is performed by subsequent processing.

The string cache memory 406 has a size which is allocated to hold a high percentage of common strings so that thrashing does not occur, while constraining the memory consumption to a reasonable size. In the illustrative embodiment, a 4-way interleaved 2048 entry cache achieves a suitable performance. The cache pointer table 407 is allocated in the system memory 240 local to the host processor 202. The string cache memory 406 is allocated to off-screen video memory in the Rambus DRAM memory 210 local to the multimedia processor 206.

The multimedia processor 206, which accelerates various operations including the operation of writing information to the display, is local to the rambus DRAM memory 210. The string cache memory 406 is advantageously located in the Rambus DRAM memory 210 so that rendered character strings are stored locally with respect to the multimedia processor 206 so that the rendered character strings are rendered without passing a substantial amount of information through the system bus 204, thereby avoiding a findamental bottleneck in the display pathway.

The host processor 202 applies the 12-bit pointer generated by the hashing operation 504 to the cache pointer table 407 to access a pointer to the string cache memory 406 which is sent from the host processor 202 to the multimedia processor 206 via the system bus 204.

Highest throughput is attained when the string caching operation 400 performs no operations to ensure that the index generated by the hashing operation 504 is mutually exclusive. In this case, an index may be the same for multiple bitmap entries in the string cache memory 406 so that a subsequent cache hit is displayed as the least recent entry in the string cache memory 406.

A verify-index operation 510 is optionally invoked to distinguish matching indices. The verify-index operation 510 uses an auxiliary cache 414 for storing the original invariant parameters associated with an index. The auxiliary cache 414 is allocated in system memory 240 local to the host processor 202. The index generated by the hashing operation 504 points to both the string cache memory 406 and the auxiliary cache 414. The verify-index operation 510 responds to a subsequent cache hit which results in an index corresponding to multiple entries in the string cache memory 406 by comparing the invariant parameters of the current string to invariant parameters stored in the auxiliary cache 414 at the indexed locations. In this manner, the verify-index operation 510 ensures reliability of the mapping by the hashing operation 504.

In various embodiments of the string caching operation 400, different embodiments of the verify-index operation 510 may be implemented to balance considerations of speed, memory usage and accuracy. For example, the auxiliary cache 414 may store only a single selected invariant parameter or a selected subset of invariant parameters. In another embodiment, the hashing operation 504 may simultaneously compute a second hash function to further reduce the probability of simultaneously computing matching indices.

In the case of a string cache miss, in a input string to cache operation 512, the rendered string and invariant attributes are stored in the string cache memory 406 which operates as a ring buffer. A queue pointer identifies the end of the string cache memory 406 and the rendered string and invariant attributes are stored at the end position, replacing an entry, if any, that currently is stored at in the string cache memory 406 at this position. Invariant string bitmaps have varying sizes so that the size of a queued entry is variable.

During the initial operation of the string caching operation 400, the string cache memory 406 is empty and nearly all input strings are not yet entered. The performance of the string caching operation 400 is relatively slow as the string cache memory 406 is initially filled. Once many common strings are stored in the string cache memory 406, display performance is substantially improved as many rendering operations are avoided.

If the string cache memory 406 is not filled, the input string to cache operation 512 simply writes a bitmap into the string cache memory 406. If the string cache memory 406 is filled, a replace cache entry operation 514 is activated to remove a bitmap entry from the string cache memory 406 prior to entering the string to the string cache memory 406.

A cache replacement algorithm replaces the oldest entry in the string cache memory 406, using what is termed a "least recently added" (LRA) or "least recently defined" cache replacement algorithm. LRA replacement replaces the oldest cache entry in a circular buffer. The LRA algorithm, although not optimized for caching efficiency, is very simple to implement using a ring buffer configuration. In other embodiments, various suitable cache replacement algorithms such as least recently used (LRU), pseudo-least recently used (pseudo-LRU), random, not last used (NLU, round-robin, and the like are alternatively implemented.

The least-recently added (LRA) cache replacement algorithm is suitable for storing rendered character strings due to the prevalence of repetition in the display of common character strings on a display. As a result of this repetitiveness, thrashing is rare since new character strings are not commonly created. If the string is not currently in the string cache memory 406, the DIB engine 116 is called to generate the rendering to a temporary buffer in a monochrome format with none of the final-stage callback operation 516 determines the application routine which originated a string rendering request for a cached bitfiap entry that is to be replaced. The callback operation 516 then notifies the application routine, if still active, of the pending replacement. The application routine may include a routine for requesting that the entry not be replaced.

Whether the input string generates a cache hit or a cache miss, a display string 518 is invoked to present the string, including rendering of invariant and variant parameters. The multimedia processor 206 receives the 12-bit pointer generated by the hashing operation 504 via the system bus 204, applies the 12-bit pointer as an index into the cache pointer table 407, and applies a pointer at the indexed location of the cache pointer table 407 to determine whether the input string is equivalently represented in the string cache memory 406.

A monochrome expand operation 520 executes in the multimedia processor 206 and performs a monochrome expand operation of the cached monochrome bit map into a color screen format for display. More particularly, the monochrome expand operation 520 accesses the cached monochrome bit map to be displayed and the corresponding X-Y coordinate display position, program color bit, and clip rectangle for the character string bit map to be displayed. The background color retains a previously-defined state and is applied as a "see-through" by the monochrome expand operation 520. The program color is invoked as directed and the accessed bit map character string is displayed with a rectangle drawn behind the bit map character string. The cached character string bit map is accessed and displayed with the displayed color, position and clipping information, with a predefined background color.

All pointer handling including the hashing operation 504 to derive a 12-bit pointer and indexing of the 12-bit pointer into the cache pointer table 407 to generate a pointer to the string cache memory 406 are executed by the host processor 202, utilizing system memory 240. The pointer to the string cache memory 406 is transferred via the system bus 204 to the multimedia processor 206 which applies the pointer to the string cache memory 406. The string cache memory 406 is simply a All pointer handling including the hashing operation 504 to derive a 12-bit pointer and indexing of the 12-bit pointer into the cache pointer table 407 to generate a pointer to the string cache memory 406 are executed by the host processor 202, utilizing system memory 240. The pointer to the string cache memory 406 is transferred via the system bus 204 to the multimedia processor 206 which applies the pointer to the string cache memory 406. The string cache memory 406 is simply a memory for holding bitmuap graphics that is accessed by the multimedia processor 206. No overhead operations are incurred by the multimedia processor 206 operating on the string cache memory 406. Software routines for controlling the pointers to the string cache memory 406 are all executed in the host processor 202. The Rambus DRAM memory 210, including the off-screen memory portion used for the string cache memory 406, simply serves as a repository for information en route to the display that is shared between multiple tasks.

While the invention has been described with reference to various embodiments, it will be understood that these embodiments are illustrative and that the scope of the invention is not limited to them. Many variations, modifications, additions and improvements of the embodiments described are possible. For example, the embodiments are described as systems which utilize a multiprocessor system including a Pentium host computer and a particular multimedia processor. Other processor configurations may be used in other embodiments.

Furthermore, the illustrative embodiment describes only a single specific mode of implementation, a proprietary display driver operating under Windows 95™ Many various implementations using different display hardware and software and operating under different operating systems are also included within the scope of the invention, as claimed.

What is claimed is:

1. A computer system including a processor, a storage, a graphics display and an application program for executing on the processor, the computer system comprising:

a string cache allocated in the storage; and an executable code stored in the storage and executable in response to an input string display request from the application program, the executable code including:

a hashing code for hashing the input string in combination with an invariant parameter to generate an index;

a string cache hit detection code for determining whether the input string in combination with the invariant parameter is represented in the string cache;

a variant parameter rendering code responsive to an affirmative determination by the string cache detection code for rendering a variant parameter in combination with the representation of the input string in combination with the invariant parameter in the string cache; and a display code for displaying the rendered input string in combination with the invariant parameter and the variant parameter.

2. The computer system according to claim 1, the executable code further comprising:

an input string and invariant parameter rendering code responsive to a negative determination by the string cache detection code for rendering the input string in combination with the invariant parameter in the string cache to generate a representation of the input string in combination with the invariant parameter; and a string cache storing code for storing the rendered input string in combination with the invariant parameter in the string cache at a location directed by the index.

3. The computer system according to claim 2 further includes a graphics accelerator coupled between the processor and the graphics display wherin the hashing code, the string cache hit detection code, the input string and invariant parameter rendering code, and the string cache storing code being executable on the processor; and the variant parameter rendering code and the display code being executable on the graphics accelerator.

4. The computer system according to claim 3 further comprising:

a bus coupled between the processor and the graphics accelerator, the string cache being locally accessible to the graphics accelerator so that a single string request across a system bus activates the display of the entire string.

5. The computer system according to claim 2 wherein invariant parameters are selected from a group of parameters including:

a character sequence of a string, a length of the string, a font selection, a text transform, a character or chart width, and a designation of whether the string is italicized.

6. The computer system according to claim 2 wherein variant parameters are selected from a group of parameters including:

a color selection of a character, a color selection of a background, an X and Y coordinate position on the display, a clipping information designating portions of display elements that lie outside of a boundary.

7. The computer system according to claim 2 further comprising:

a pointer table allocated in the storage and addressed by the index generated by the hashing code to generate a pointer into the string cache.

8. The computer system according to claim 2 wherein the executable code further comprises:

a replacement code for determining a string cache entry for replacement, the string cache storing code storing a rendered input string at the position of the replaced entry.

9. The computer system according to claim 8 wherein the replacement code performs a "least recently added" (LRA) replacement technique.

10. The computer system according to claim 2 wherein:

the representation of the input string in combination with the invariant parameter that is generated by the an input string and invariant parameter rendering code and stored in the string cache by the string cache storing code is a bitmap object.

11. A method of operating a computer system including a processor, a storage, a graphics display and an application program for executing on the processor, the method comprising the steps of:

allocating a string cache in the storage;

hashing an input string in combination with an invariant parameter to generate an index;

determining whether the input string in combination with the invariant parameter is represented in the string cache;

in response to an affirmative determination, rendering a variant parameter in combination with the representation of the input string in combination with the invariant parameter in the string cache; and displaying the rendered input string in combination with the invariant parameter and the variant parameter.

12. The method according to claim 11 further comprising the steps of:

in response to negative determination, rendering the input string in combination with the invariant parameter in the string cache to generate a representation of the input string in combination with the invariant parameter; and storing the rendered input string in combination with the invariant parameter in the string cache at a location directed by the index.

13. The method according to claim 12 further comprising the steps of:

determining a string cache entry for replacement, a rendered input string being stored at the position of the replaced entry by the storing step.

14. The method according to claim 13 wherein the replacement code performs a "least recently added" (LRA) replacement technique.

15. An article of manufacture comprising:

a non-volatile memory;

a plurality of instruction codes stored in the non-volatile memory, the instructional codes setting forth information relating to controlling a string cache queue that is used for rendering and displaying string information from a processor to a display screen in response to an input string display request from the application program, the instruction code including:

a hashing code for hashing the input string in combination with an invariant parameter to generate an index;

a string cache hit detection code for determining whether the input string in combination with the invariant parameter is represented in the string cache;

a variant parameter rendering code responsive to an affirmative determination by the string cache detection code for rendering a variant parameter in combination with the representation of the input string in combination with the invariant parameter in the string cache; and a display code for displaying the rendered input string in combination with the invariant parameter and the variant parameter on the display screen.

16. The article of manufacture according to claim 15, the instruction code further comprising:

an input string and invariant parameter rendering code responsive to a negative determination by the string cache detection code for rendering the input string in combination with the invariant parameter in the string cache to generate a representation of the input string in combination with the invariant parameter; and a string cache storing code for storing the rendered input string in combination with the invariant parameter in the string cache at a location directed by the index.

17. A method of providing a computer system including a processor, a storage, a graphics display and an application program for executing on the processor, the method comprising:

providing a string cache allocated in the storage; and providing an executable code stored in the storage and executable in response to an input string display request from the application program, the executable code including:

a hashing code for hashing the input string in combination with an invariant parameter to generate an index;

a string cache hit detection code for determiring whether the input string in combination with the invariant parameter is represented in the string cache;

a variant parameter rendering code responsive to an affirmative determination by the string cache detection code for rendering a variant parameter in combination with the representation of the input string in combination with the invariant parameter in the string cache; and a display code for displaying the rendered input string in combination with the invariant parameter and the variant parameter.

18. The method according to claim 17, the executable code fther comprising:

an input string and invariant parameter rendering code responsive to a negative determination by the string cache detection code for rendering the input string in combination with the invariant parameter in the string cache to generate a representation of the input string in combination with the invariant parameter; and a string cache storing code for storing the rendered input string in combination with the invariant parameter in the string cache at a location directed by the index.

19. The method according to claim 18 further comprising the steps of:

providing a graphics accelerator coupled between the processor and the graphics display, the graphics accelerator;

the hashing code, the string cache hit detection code, the input string and invariant parameter rendering code, and the string cache storing code being executable on the processor; and the variant parameter rendering code and the display code being executable on the graphics accelerator.

20. The method according to claim 19 further comprising the steps of:

providing a bus coupled between the processor and the graphics accelerator, the string cache being locally accessible to the graphics accelerator so that a single string request across a system bus activates the display of the entire string.

21. The computer system including a processor, a storage, a graphics display and an application program for executing on the processor, the computer system comprising:

a string cache allocated in the storage; and means for hashing the input string in combination with an invariant parameter to generate an index;

means for determining whether the input string in combination with the invariant parameter is represented in the string cache;

means responsive to an affirmative determination by the string cache detection code for rendering a variant parameter in combination with the representation of the input string in combination with the invariant parameter in the string cache; and means for displaying the rendered input string in combination with the invariant parameter and the variant parameter.

22. The computer system according to claim 21, further comprising:

means responsive to a negative determination by the string cache detection code for rendering the input string in combination with the invariant parameter in the string cache to generate a representation of the input string in combination with the invariant parameter; and means for storing the rendered input string in combination with the invariant parameter in the string cache at a location directed by the index.

23. The computer system according to claim 22 further comprising:

a bus coupled between the processor and the graphics accelerator, the string cache being locally accessible to the graphics accelerator so that a single string request across a system bus activates the display of the entire string.

* * * * *